United States Patent Office 3,585,209
Patented June 15, 1971

---

3,585,209
OXADIAZOLE DERIVATIVES AND PROCESS FOR PREPARING SAME
Christian Derappe, Gretz, France, assignor to Chimie et Synthese de Picardie, Pont de Metz, France
No Drawing. Filed Nov. 29, 1966, Ser. No. 597,511
Claims priority, application France, Dec. 14, 1965, 42,121; Mar. 14, 1966, 53,265
Int. Cl. C07d 85/54
U.S. Cl. 260—307                    10 Claims

ABSTRACT OF THE DISCLOSURE

The invention relates to oxadiazole derivatives of the formula:

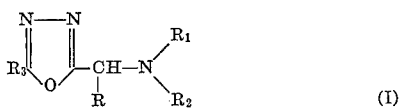

(I)

wherein R and $R_3$ are each hydrogen or lower alkyl and $R_1$ and $R_2$ are each alkyl or cycloalkyl (5–6 carbon atoms). These derivatives have an effect on the central nervous system and are useful for treating cardiovascular diseases.

---

The present invention relates to novel oxadiazole derivatives of general formula:

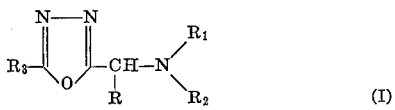

(I)

wherein R is hydrogen or a lower alkyl group, $R_1$ and $R_2$, which may be the same or different, are each an alkyl or cycloalkyl group and $R_3$ is hydrogen or a lower alkyl group, and to their addition salts with acids and their quaternary ammonium salts.

These novel derivatives are useful as photographic sensitizers and as intermediates in the synthesis of novel active compounds. They also have per se useful therapeutic properties, especially as anti-inflammatory and sedative compounds useful in human medicine.

The invention relates also to a process for the preparation of the novel aforesaid derivatives. This process is characterized in that it comprises reacting an hydrazide of formula:

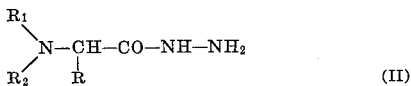

(II)

with an orthoester of formula $R_3$—$C(OR_4)_3$, R, $R_1$, $R_2$ and $R_3$ having the above defined meanings, and $R_4$ being a lower alkyl group.

The reaction occurs in two stages. There is first a condensation of the hydrazide and of the orthoester resulting, with elimination of two moles alcohol $R_4OH$, in the production of an intermediate product of formula:

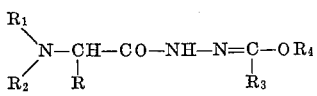

The latter, which is unisolated, subsequently undergoes ring closure into oxadiazole (I).

Such cyclization is all the more remarkable since, heretofore, only aromatic or heterocyclic hydrazides were considered to be capable of undergoing ring closure into oxadiazoles.

To obtain high yields, it is convenient to heat the hydrazide and the orthoester under reflux during several hours, the orthoester being used in great stoichiometric excess. Preferably, the reagents used are heated during about thirty hours, at a rate of about 16 moles orthoester per 1 mole hydrazide, as such conditions were found to result in optimum yields, as apparent from the following experiments. To investigate the influence of the amount of orthoester, 1 mole of diethylaminoacetylhydrazide was heated during fifteen hours with 6, 8, 10, 16 and 32 moles of ethyl orthoformate. The yields were 29%, 37.4%, 50%, 64.5% and 61%, respectively. Thus, maximum yield is obtained with 16 moles orthoester. To investigate the influence of the heating time, 1 mole hydrazide was heated with 8 moles orthoester during the following periods of time: ten, fifteen, eighteen, twenty, twenty-five, thirty and sixty hours. The yields obtained were 29%, 37%, 41.1%, 51.6%, 56.5%, 66.1% and 61%, respectively, thus, maximum yield being obtained at thirty hours. Thus, from the combined data of both investigations, the results set forth above are obtained. In fact, when 1 mole diethylaminoacetylhydrazide is heated with 16 moles ethyl orthoformate during thirty hours, there is obtained a yield of 77.1% in oxadiazole (I).

Thus, the preferred general procedure is as follows: refluxing of the reagents in the indicated ratios during thirty hours, with subsequent cooling and evaporation in vacuo of the resulting alcohol and of excess orthoester, and distillation of the residue under a vacuum of 70–120 mm. Hg to insure cyclization of the intermediate product into oxadiazole. This oxadiazole may then be submitted to a stripping procedure and, when desired, converted into a salt by the usual methods.

The starting hydrazides (II) are described generally in the paper by R. Rips, C. Derappe & P. Magnin (J. Med. Chem., 8, p. 529 (1965)).

The practice of this invention is further illustrated by means of the following examples which are not intended to be limitative on the scope of the invention. In the examples, unless specifically identified, R and $R_3$ represent hydrogen.

EXAMPLE 1

2-diethylaminomethyl-1,3,4-oxadiazole ($R_1$=$R_2$=$C_2H_5$) or Compound No. 406

In a 1000 cc. flask, there are mixed 29 g. diethylaminoacetylhydrazide (0.2 mol) and 540 cc. ethyl orthoformate (3.2 mol). The mixture is allowed to boil during thirty hours. After cooling, the alcohol formed during the reaction and the excess ethyl orthoformate are evaporated in vacuo. An orange red oil going over at 170–180° C. distils with production of fumes. The material is stripped in vacuo. There are collected 23.5 g. of a pale yellow liquid going over at 118–120° C. under 13 mm. It has a refractive index of 1.4605 at 25° C. The yield is 77.1% of theoretical.

*Analysis.*—Calculated (percent): C, 54.17; H, 8.44; N, 27.08; O, 10.35. Found (percent): C, 54.07; H, 8.84; N, 26.81; O, 10.24.

The hydrochloride of the resulting oxadiazole is prepared by dissolving 2 g. of the latter in 400 ml. anhydrous ether and adding dropwise an ethereal hydrochloric acid solution. After precipitation of the hydrochloride, it is washed with ether and dried over $P_2O_5$ (M.P.=148–149° C.). The oxadiazole oxalate is obtained by dissolving the oxadiazole in ethyl alcohol and adding an alcohol oxalic acid solution. After heating at least for one hour, the alcohol is evaporated in vacuo and crystallized from ethyl acetate (M.P.=93° C.). Analysis of the oxalate shows that 2 moles oxadiazole react with 3 moles oxalic acid.

EXAMPLE 2

2-dipropylaminomethyl-1,3,4-oxadiazole
($R_1=R_2=CH_3(CH_2)_2$) or Compound No. 479

104 g. (0.6 mol) dipropylaminoacetylhydrazide and 1590 cc. ethyl orthoformate (9.6 mol) are heated during thirty hours. Distillation is effected under a vacuum of 70 mm.; boiling occurs at about 180° C. After stripping under 0.4 mm., there are collected 86 g. of a pale yellow liquid distilling at 65–66° C. The yield obtained is 86% of theoretical. The oxadiazole has a refractive index of 1.4575 at 25° C.

*Analysis.*—Calculated (percent): C, 58.99; H, 9.35; N, 22.93; O, 8.73. Found (percent): C, 59.00; H, 9.30; N, 23.13; O, 9.26.

The hydrochloride obtained as in Example 1 is hygroscopic and melts with decomposition at 145° C.

EXAMPLE 3

2diisopropylaminomethyl-1,3,4-oxadiazole
($R_1=R_2=(CH_3)_2CH$) or Compound No. 478

A mixture of 110 g. diisopropylaminoacetylhydrazide (0.636 mol) and 1681 cc. ethyl orthoformate (10.176 moles) is heated during thirty hours. Distillation is effected under a vacuum of 70 mm. Boiling occurs at about 180° C. After stripping under 0.4 mm. there are collected 84.3 g. of a pale yellow oil distilling at 68–9° C. The yield is 72.3% of theoretical. The oxadiazole has a refractive index of 1.4622 at 25° C.

*Analysis.*—Calculated (percent): C, 58.99; H, 9.35; N, 22.93; O, 8.73. Found (percent): C, 58.65; H, 9.27; N, 22.96; O, 9.65.

The hydrochloride is highly hygroscopic and melts with decomposition at 170° C., whereas the maleate melts at 120° C.

EXAMPLE 4

2-dibutylaminomethyl-1,3,4-oxadiazole
($R_1=R_2=CH_3(CH_2)_3$) or Compound No. 532

A mixture of 100.7 g. dibutylaminoacetylhydrazide (0.5 mol) and 1322 cc. ethyl orthoformate (8 mol) is heated during thirty hours. Distillation is effected under a vacuum of 70 mm.; boiling occurs at about 190° C. After stripping under 0.25 mm. there are collected 84.5 g. of a pale yellow oil distilling at 80° C. The yield is 80% of theoretical. The oxadiazole has a refractive index of 1.4529 at 25° C.

*Analysis.*—Calculated (percent): C, 62.52; H, 10.02; N, 19.89; O, 7.57. Found (percent): C, 62.56; H, 9.97; N, 19.99; O, 7.88.

EXAMPLE 5

2-diisobutylaminomethyl-1,3,4-oxadiazole
($R_1=R_2=(CH_3)_2CHCH_2$) or Compound No. 540

A mixture of 80.4 g. of diisobutylaminoacetylhydrazide (0.4 mole) and 1057 cc. ethyl orthoformate (6.4 moles) is boiled during thirty hours. Distillation is effected under a vacuum of 70 mm.; boiling occurs at about 190° C. After stripping under 15 mm., there is collected a pale yellow liquid distilling at 140° C. Its refractive index is 1.4520 at 25° C.

*Analysis.*—Calculated (percent): C, 62,52; H, 10.02; N, 19.89; O, 7.57. Found (percent): C, 62.43; H, 10.47; N, 20.53; O, 7.90.

EXAMPLE 6

2-diamylaminomethyl-1,3,4-oxadiazole
($R_1=R_2=CH_3(CH_2)_4$) or Compound No. 707

A mixture of 25 g. diamylaminoacetylhydrazide (0.109 mol) and 288 cc. ethyl orthoformate (1.745 mol) is boiled during thirty hours. The mixture is heated during one hour under a vacuum of 90 mm. and is distilled under 13 mm.; B.P.: 170° C. After stripping under 0.3 mm. (B.P.: 114° C.) there are obtained 15 g. (yield 57.5%) of a yellow viscous oil having a refractive index of 1.457 at 25° C.

EXAMPLE 7

2-diisoamylaminomethyl-1,3,4-oxadiazole
($R_1=R_2=(CH_3)_2CH(CH_2)_2$) or Compound No. 541

A mixture of 50 g. diisoamylaminoacetylhydrazide (0.218 mol) and 576 cc. ethyl orthoformate (3.488 mol) is boiled during thirty hours. Distillation is effected under a vacuum of 70 mm.; boiling occurs at about 200° C. After stripping under a vacuum of 14 mm., there are collected 38.5 g. of a pale yellow oil distilling at 162° C. The yield is 73.9% of theoretical. The product has a refractive index of 1.456 at 25° C.

*Analysis.*—Calculated (percent): C, 65.23; H, 10.53; N, 17.57; O, 6.68. Found (percent): C, 65.08; H, 10.39; N, 17.11; O, 7.70.

EXAMPLE 8

2-dicyclopentylaminomethyl-1,3,4-oxadiazole

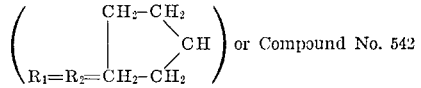 or Compound No. 542

A mixture of 18.5 g. dicyclopentylaminoacetylhydrazide (0.082 mol) and 217 cc. ethyl orthoformate (1.312 mol) is boiled during thirty hours. Distillation is effected under a vacuum of 70 mm., boiling occurs at about 220° C. After stripping under a vacuum of 15 mm. there are collected 18.5 g. of a highly viscous yellow oil distilling at 198° C. The yield is 58.3% of theoretical. The product has a refractive index of 1.5067 at 25° C.

*Analysis.*—Calculated (percent): C, 66.35; H, 8.99; N, 17.86; O, 6.80. Found (percent): C, 66.45; H, 9.00; N, 17.51; O, 7.30.

EXAMPLE 9

2-dicyclohexylaminomethyl-1,3,4-oxadiazole

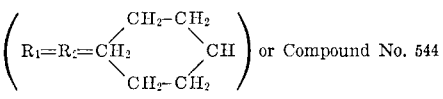 or Compound No. 544

A mixture of 36.2 g. dicyclohexylaminoacetylhydrazide (0.143 mol) and 380 cc. ethyl orthoformate (2.288 mol) is boiled during thirty hours. Distillation is effected under a vacuum of 70 mm.; boiling occurs at about 230° C. After stripping under a vacuum of 15 mm., there are collected 13.8 g. of a highly viscous yellow oil distilling at 217–218° C. The yield is 36.6% of theoretical. The product has a refractive index of 1.5073 at 25° C.

*Analysis.*—Calculated (percent): C, 68.40; H, 9.57; N, 15.95; O, 6.07. Found (percent): C, 68.47; H, 9.63; N, 16.03; O, 6.23.

EXAMPLE 10

2-dihexylaminomethyl-1,3,4-oxadiazole
($R_1=R_2=CH_3(CH_2)_5$) of Compound No. 621

A mixture of 26.7 g. di-n-hexylaminoacetylhydrazide (0.1045 mol) and 280 cc. ethyl orthoformate (1.672 mol) is boiled during thirty hours. Distillation is effected under a vacuum of 70 mm.; boiling occurs at about 220° C. The cyclization reaction is barely noticeable (little fumes). Double stripping: B.P.: 134° C./0.1 mm. There are collected 24.5 g. of a yellow oil having a refractive index of 1.460 at 25° C. The yield is 87.7% of theoretical.

*Analysis.*—Calculated (percent): C, 67.37; H, 10.93; N, 15.71; O, 5.98. Found (percent): C, 67.07; H, 10.93; N, 15.79; O, 5.80.

EXAMPLE 11

2-(1'-diethylaminoethyl)-1,3,4-oxadiazole ($R=CH_3$, $R_1=R_2=C_2H_5$) or Compound No. 602

A mixture of 57.2 g. α-diethylaminopropionylhydrazide and 950 ml. ethyl orthoformate is heated under reflux during thirty hours. The resulting alcohol and the excess ethyl orthoformate are evaporated in vacuo. After distilling under 70 mm. and stripping under 18 mm. (B.P.=

123° C.), there are collected 34.6 g. of a pale yellow oil (yield 56.9% of theoretical) having a refractive index of 1.4595 at 25° C.

Analysis.—Calculated (percent): C, 56.78; H, 8.93; N, 24.83; O, 9.46. Found (percent): C, 56.43; H, 8.90; N, 24.44; O, 10.04.

The methiodide of this oxadiazole is prepared by mixing, without a solvent, 3 g. of the latter with 1.1 ml. methyl iodide. The mixture is left standing for three hours after which it sets to a mass. The resulting solid is recrystallized from ethanol to constant melting points: M.P.=193° C. (Reichert).

Analysis.—Calculated (percent): C, 34.73; H, 5.83; N, 13.50; O, 5.14; I, 40.80. Found (percent): C, 35.32; H, 5.83; N, 13.74; O, 4.99; I, 40.36

The α - diethylaminopropionylhydrazide used for the preparation of the oxadiazole of this example is a novel compound. It is prepared as follows:

A mixture of 92 g. ethyl α-diethylaminopropionate, 40 ml. hydrazine hydrate and 100 ml. ethanol is heated during 24 hours. The alcohol and the excess hydrazine hydrate are evaporated in vacuo. After distilling under 1 mm. there are collected 57 g. of a colorless viscous oil (68% of the theoretical yield). B.P.=95–97° C.

According to the procedure of Examples 1–11, except that the orthoformate is substituted with a higher orthoester such as ethyl orthoacetate or orthopropionate, there were prepared oxadiazoles (I) wherein $R_3$ is a lower alkyl group instead of being hydrogen.

In the following table are set forth the resulting compounds together with their physical-chemical properties.

In this table are given the meanings of the groups $R_1$, $R_2$ and $R_3$ of such compounds, R, which is not indicated, being in all cases hydrogen.

Indeed, the hypotensive action is exhibited by the following compounds: 406, 478, 479, 532, 540 and 541 in cats and dogs.

On the other hand, bradycardia is noted with Compounds 406 and 532.

In addition, derivatives (I) exhibit marked peripheral vasodilator properties, especially the hydrochlorides of Compounds 406, 478 and 479. With such compounds using the constant rate perfusion technique of the hind portion of the test animals, a strong decrease of the peripheral vascular resistance is noted with intra-arterial doses of 5 mg./kg., without modification of the systemic pressure.

(IV) Anti-inflammatory action.—This activity was especially studied using the kaolin-induced arthritis technique. Thus, an inflammation of the tibio-tarsal area of the paw of the albino rat is generated by an intra-articular injection of a water suspension of kaolin. The inflammatory reaction is evaluated by measuring the thickness of the limb of control and test animals. Thus, the vascular component of the inflammation is investigated.

The test is conducted under the following conditions. Each test compound is injected in two equal doses, the first dose being injected fifteen hours prior injection of the inflammatory product and the second dose being injected one hour prior to such injection. Exceptionally, the compound may be injected in three equal doses, the additional injection being given between the two others. Simultaneously, under the same conditions as above, cortisone is injected to reference animals in two—exceptionally, three—equal doses such that the reference animals are administered a total cortisone dosage equal to half the dosage of each test compound injected to the treated animals. The decrease of the cortisone-induced inflam-

| Compound (I) | | | Properties | | | Analysis, percent | | | | | | | |
|---|---|---|---|---|---|---|---|---|---|---|---|---|---|
| | | | | | | Calculated | | | | Found | | | |
| Code Number | $R_1=R_2$ | $R_3$ | Yield, percent | B.P., °C./mm. | $n_D^{25}$ | C | H | N | O | C | H | N | O |
| 557 | $CH_3(CH_2)_2$ | $CH_3$ | 71.9 | 66/0.1 | 1.456 | 60.88 | 9.71 | 21.30 | 8.11 | 61.00 | 9.76 | 21.37 | 8.36 |
| 615 | $CH_3(CH_2)_2$ | $C_2H_5$ | 88.4 | 76/0.1 | 1.455 | 62.52 | 10.02 | 19.89 | 7.57 | 62.68 | 9.98 | 20.07 | 7.67 |
| 630 | $(CH_3)_2CHCH_2$ | $CH_3$ | 81.7 | 98/0.15 | 1.4629 | 63.96 | 10.29 | 18.65 | 7.10 | 63.73 | 10.38 | 18.95 | 7.55 |
| 625 | $(CH_3)_2CH(CH_2)_2$ | $CH_3$ | 56.4 | 116/0.15 | 1.4562 | 66.36 | 10.74 | 16.58 | 6.31 | 66.12 | 10.56 | 16.92 | 6.77 |
| 631 | $(CH_3)_2CH(CH_2)_2$ | $C_2H_5$ | 83.4 | 142/0.6 | 1.4558 | 67.37 | 10.93 | 15.71 | 5.98 | 67.00 | 10.83 | 15.75 | 6.63 |

The following data resulted from the pharmacological investigation of derivatives (I), the derivatives being designated hereinunder by their code number, for brevity.

(I) Toxicity.—Toxicity studies effected intraperitoneally in mice show that derivatives (I) have little toxicity. The highest lethal doses are within the range from 100 mg. to 1000 mg. for $LD_0$ and $LD_{100}$. Three derivatives (I) have a $LD_0$ higher than 1 g., these are derivatives 406, 542 and 544.

(II) Action on the central nervous system.—Derivatives (I) were studied in the field of the central nervous system, using various techniques, to investigate:

the technical behavior of simple observation;
the technical behavior of motility;
the technical behavior to the test of the bored board;
the technical behavior to the chimney test;
the reinforcement of narcosis;
the central temperature;
the anticonvulsant action.

From these various tests, it is noted that, generally, derivatives (I) are depressants. On the other hand, compounds 540, 541 and 532 are highly sedative, compounds 406, 541 and 557 are temperature depressants, and compound 479 is an anti-convulsant, both with respect to chemical convulsants and to electro-shock.

Compounds 406, 478, 542, 544, 625 and 631 have a potentiating effect on induced narcosis.

(III) Action on the cardiovascular system.—In this field, a general investigation has made it apparent that derivatives (I) exhibit useful properties in the cardiovascular field.

mation is observed in the reference animals 3 hrs., 5 hrs., 24 hrs., 30 hrs., 46 hrs. and 54 hrs. after injection of the inflammatory product. The same observation is carried out in the treated animals, and the decrease of the inflammation noted at each of the above mentioned periods of time is plotted against the decrease obtained with cortisone at the same period of time which is taken as unity. Thus, for example, if, after 3 hours, the decrease noted with the test compound is twice the decrease obtained with cortisone, also after 3 hours, this compound will be rated 2.

The results obtained with various derivatives (I) are summarized in the following table.

TABLE

| Derivative (I) Code No. | Dosage, mg./kg. | Decrease of the inflammation after— | | | | | |
|---|---|---|---|---|---|---|---|
| | | 3 hrs. | 5 hrs. | 24 hrs. | 30 hrs. | 46 hrs. | 54 hrs. |
| 406 | 2×100 | 0.74 | 0.48 | 0.32 | | | |
| | 3×100 | 1.15 | 0.52 | 0.56 | 0.56 | 0.66 | 0.70 |
| 479 | 2×100 | 0.40 | 0.27 | | | | |
| 478 | 2×100 | 0.71 | 0.46 | 0.11 | | | |
| 540 | 2×100 | 2.44 | 2.1 | 2.1 | | 2.8 | 0.68 |
| 541 | 2×100 | 1.07 | 0.94 | 1.2 | 1.23 | 0.99 | 0.95 |
| 557 | 2×100 | 0.31 | 0.52 | 0.55 | | | W |
| 542 | 2×100 | 0.88 | 1.08 | 0.52 | 1.32 | 1.53 | 1.03 |
| 544 | 2×100 | 0.85 | 1.92 | 0 | 1.42 | 0.31 | 0 |
| 621 | 2×100 | 0.98 | 0.80 | 0.78 | 0.93 | 0.52 | 1.04 |
| 625 | 2×100 | 0.88 | 1.25 | 0.20 | 0.21 | 0 | 0.18 |
| 630 | 2×100 | 1.75 | 1.74 | 1.52 | 1.13 | 0.8 | 0 |
| 631 | 2×100 | 1.23 | 2.17 | 1.95 | 0.91 | 0.79 | 0 |
| 707 | 2×100 | 0.50 | 0.46 | 0.60 | 0.60 | 0.45 | 0.45 |

It results from this table that derivatives (I) exhibit generally a useful anti-inflammatory activity, Compounds 540, 630 and 631 seeming to be quite particularly active.

It is apparent from the above that derivatives (I) are therapeutically useful, particularly as depressants of the central nervous system, as anti-inflammatory compounds and in the treatment of cardio-vascular diseases.

In such treatments, they may be administered orally, parenterally, rectally or topically, the derivatives (I) being associated with the suitable vehicles or excipients for those various routes of administration to constitute the usual pharmaceutical formulations such as tablets, drinkable and injectable ampoules, suppositories, creams, lotions and ointments.

Having now described my invention, what I claim as new and desire to secure by Letters Patent is:

1. An oxadiazole derivative selected from the group consisting of compounds of the formula:

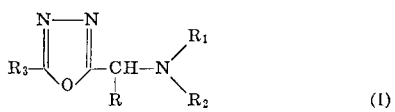

wherein R is selected from the group consisting of hydrogen and lower alkyls, $R_1$ and $R_2$ are each selected from the group consisting of lower alkyls, cyclopentyl and cyclohexyl, and $R_3$ is selected from the group consisting of hydrogen and lower alkyls, and their hydrochlorides, maleates, oxalates and methiodides.

2. A compound of claim 1 which is 2-dipropylaminomethyl-1,3,4-oxadiazole.

3. A compound of claim 1 which is 2-diisobutylaminomethyl-1,3,4-oxadiazole.

4. A compound of claim 1 which is 2-diamylaminomethyl-1,3,4-oxadiazole.

5. A compound of claim 1 which is 2-dicyclopentylaminomethyl-1,3,4-oxadiazole.

6. A compound of claim 1 which is 2-diisoamylaminoethyl-5-ethyl-1,3,4-oxadiazole.

7. Process for the preparation of a compound of the formula:

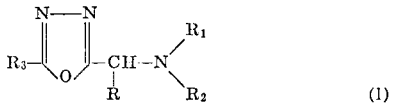

wherein R is selected from the group consisting of hydrogen and lower alkyls, $R_1$ and $R_2$ are each selected from the group consisting of alkyls, cyclopentyl and cyclohexyl, and $R_3$ is selected from the group consisting of hydrogen and lower alkyls, said process comprising reacting an hydrazide of the formula:

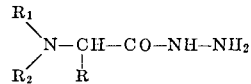

with an orthoester of the formula $R_3-C(OR_4)_3$, R, $R_1$, $R_2$ and $R_3$ having the meanings defined above and $R_4$ being a lower alkyl group and collecting the resulting product.

8. Process for the preparation of a compound of the formula:

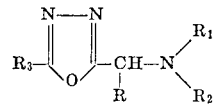

wherein R is selected from the group consisting of hydrogen and lower alkyls, $R_1$ and $R_2$ are each selected from the group consisting of lower alkyls, cyclopentyl and cyclohexyl, and $R_3$ is selected from the group consisting of hydrogen and lower alkyls, comprising heating under reflux, during several hours, a mixture of an hydrazide of the formula

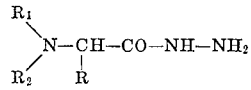

and of an orthoester of the formula $R_3-C(OR_4)_3$, formulae wherein R, $R_1$, $R_2$ and $R_3$ have the above defined meanings and $R_4$ is a lower alkyl, the orthoester being present in this mixture in great stoichiometric excess and collecting the resulting product.

9. Process as claimed in claim 8, wherein the heating is carried out for about thirty hours, the orthoester being used at a rate of about 16 moles per 1 mole hydrazide.

10. Process as claimed in claim 8, wherein, after said heating, the excess orthoester and the alcohol formed are removed and the residue is distilled in vacuo.

References Cited

UNITED STATES PATENTS 2,733,245   1/1956   Ainsworth _____ 260—307

ALTON D. ROLLINS, Primary Examiner

U.S. Cl. X.R.

260—453, 561; 424—272